April 20, 1926.
A. POULSEN ET AL
1,581,598
RECORDING MEANS
Filed March 31, 1924
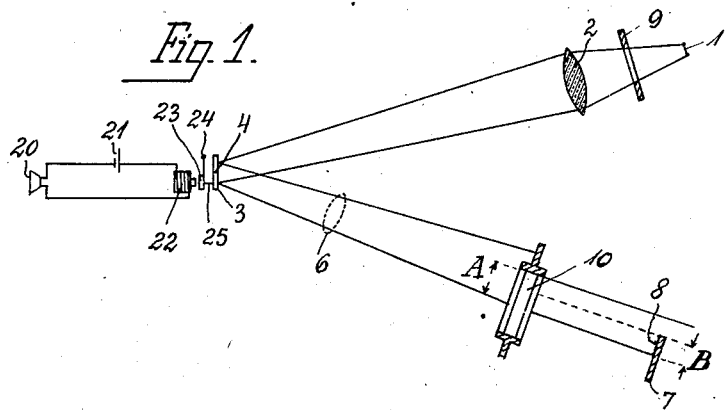
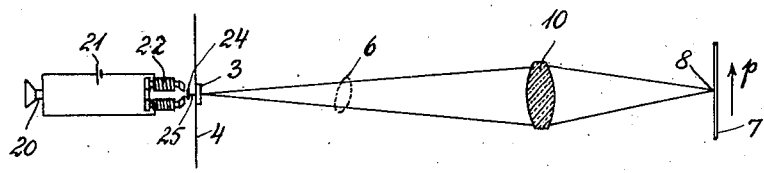
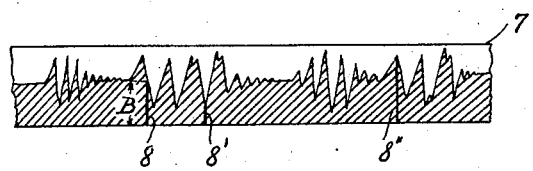
Inventors:
Arnold Poulsen and
Axel Carl Georg Petersen Patented Apr. 20, 1926.

1,581,598

UNITED STATES PATENT OFFICE.

ARNOLD POULSEN AND AXEL CARL GEORG PETERSEN, OF COPENHAGEN, DENMARK.

RECORDING MEANS.

Application filed March 31, 1924. Serial No. 703,123.

*To all whom it may concern:*

Be it known that we, ARNOLD POULSEN and AXEL CARL GEORG PETERSEN, subjects of the King of Denmark, residing at Copenhagen, Denmark, have invented certain new and useful Improvements in Recording Means, of which the following is a specification.

It is well known to record on a sensitized film, moving at a uniform speed, graphic representations of sound waves by reflecting a beam of light of constant intensity by means of a mirror which is vibrated in accordance with the sound waves. The graphic record of the sound waves upon the film forms a continuous, uniformly-exposed band called a "phonogram", the undulations of the record transversely to the direction of movement of the film being produced in accordance with the variation of the sound waves.

It has been suggested to use a cylindrical lens for the purpose of concentrating on a film a light pencil or beam reflected from a vibrating mirror, the axis of the cylindrical lens being parallel to the line of motion of the reflected bundle of rays; and either a slit is disposed in the path of the reflected rays, which slit determines the width of each individual image formed on the film, or a source of light (such as an electric arc) is used which necessitates disposing the mirror and the image formed on the film by means of the cylindrical lens at conjugate foci, whereby the said image is rendered as bright as possible, in order to prevent the different images in juxtaposition on the film from partly overlapping one another.

Now the width of a slit cannot, however, in practice, be made so extremely minute that the mutual overlapping of the images can be prevented, so that the use of a slit should preferably be avoided. On the other hand, the formation of the images on the film in the focal line of the cylindrical lens should be avoided because the film is inflammable and would readily be spoiled by the heating which is caused by the concentration of the considerable amount of heat rays along the aforesaid focal line.

According to the present invention, a sufficiently narrow image is formed on the film without the use of a slit in the path of the reflected rays and without the necessity for the formation of the images in the focal line of the lens, by making the source of light linear and forming on the film by means of the cylindrical lens a linear image of said light source—for instance, a rectilinear part of a filament.

On the drawing—

Figure 1 is a schematic plan view of the registering means and

Figure 2 is a schematic front view of the means for projecting the reflected beam upon the film, Figure 3 is an enlarged fragmental section of a phonogram.

1 (Fig. 1) is a source of light preferably of rectilinear shape such as an electric filament, and 2 is a collecting lens concentrating on a mirror 3 a beam of light rays from the light source 1, Fig. 1. The mirror 3 can vibrate about the axis 4. The beam 6, reflected from the mirror 3, meets a cylinder-lens 10, Figs. 1 and 2, located in its path in such a manner that the lens 10 forms on the film 7 a linear image 8 of the light source. A screen 9 having a slot 11 is inserted in the path of the beam to be concentrated by the lens 2, thus limiting the extension of said beam in directions parallel to the axis of the cylinder-lens 10.

When the mirror 3 is caused to vibrate about the axis 4 in accordance with some sound waves to be registered on the film, and in any known manner,—for instance by means of a microphonic circuit including a microphone 20, an electrical current source 21 and an electromagnet 22 vibrating an iron piece or armature 23 connected to the rear side of the mirror 3 by means of a pin 24, then the beam reflected from the mirror 3 will illuminate a part of the cylindrical lens 10, and the length A of said illuminated part of the lens 10 will vary in accordance with the sound waves.

The image 8, formed on the film 7, moving in the direction of the arrow $p$ in Figure 2, will have an extension B, Figs. 1 and 3, transversely to the moving direction of the film, which varies in accordance with the length A of the illuminated part of the cylindrical lens 10, and consequently said extension varies in due conformity to the sound waves to be registered. The intensity of the light and, therefore, the density of the picture which may be developed on the film after the exposure of same caused by the formation of the image 8 on the film, will be uniform in every part of said picture, which forms the graphic representation of the sound waves.

When the mirror occupies its normal position, i. e. when the mirror 3 is not influenced by electrical currents in the telephonic circuit, then a certain part, for instance the half part of the length of the cylindrical lens 10, is illuminated by the light reflected from the mirror 3.

By the use of a cylinder lens 10, very distinct and narrow images of the source of light 1 are formed on the film 7; see the individual images 8, 8' and 8'' in Fig. 3. If a rectilinear source of light 1 such as a filament is used, it would be possible to form on the film a practically linear, i. e. exceedingly narrow image; and in the phonogram Fig. 3 formed by the total number of different images projected on the film, the different elements (images) representing the individual sounds do not partly cover one another to the degree present in phonograms registered by hitherto known processes for registering sound waves on a film.

Having now particularly described and ascertained the nature of our said invention and in what manner the same is to be performed, we declare that what we claim is:—

A system of recording graphic representations of sound waves on a moving sensitized film, comprising a linear, filamentary source of light of constant intensity, a concentrating lens in the path of a beam of light emitted by said filament, a mirror for reflecting said beam, means for oscillating said mirror by the sound waves to be recorded, and a cylindrical lens arranged in the path of the reflected beam with its axis substantially parallel with the line of motion of said beam, whereby said mirror and cylindrical lens will conjointly act to produce a linear image of the lighting filament directly on the film.

In testimony whereof we affix our signatures.

ARNOLD POULSEN.
AXEL CARL GEORG PETERSEN.